(12) United States Patent
Korkowski et al.

(10) Patent No.: US 6,570,742 B2
(45) Date of Patent: *May 27, 2003

(54) HEAD ACTUATOR WITH HEAD SUPPORT EXCITATION SHIELD

(75) Inventors: Kurt J. Korkowski, Hudson, WI (US); Theodore R. Browning, Bloomington, MN (US); Jung S. Park, Olympia, WA (US); Warren S. Karau, Bloomington, MN (US); Gary M. Amendola, Savage, MN (US)

(73) Assignee: Seagate Technology LLC, Scotts Valley, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/425,468
(22) Filed: Oct. 22, 1999
(65) Prior Publication Data US 2002/0048123 A1 Apr. 25, 2002

Related U.S. Application Data

(60) Provisional application No. 60/126,345, filed on Mar. 26, 1999.

(51) Int. Cl.$^7$ ............................. G11B 5/55; G11B 33/14
(52) U.S. Cl. ....................................... 360/266; 360/97.02
(58) Field of Search ............................. 360/266, 265.7, 360/265.9, 264.1, 97.02

(56) References Cited

U.S. PATENT DOCUMENTS

| 4,879,618 | A | | 11/1989 | Iida et al. .................... 360/106 |
| 5,014,146 | A | * | 5/1991 | Takatsuka et al. .......... 360/106 |
| 5,036,416 | A | * | 7/1991 | Mastache .................... 360/105 |
| 5,999,372 | A | * | 12/1999 | Peterson et al. ............ 360/106 |
| 6,097,568 | A | * | 8/2000 | Ekhoff ....................... 360/97.02 |

FOREIGN PATENT DOCUMENTS

| JP | 58-70459 | * | 4/1983 |
| JP | 10-92131 | * | 4/1998 |

* cited by examiner

Primary Examiner—Jefferson Evans
(74) Attorney, Agent, or Firm—Westman, Champlin & Kelly, P.A.

(57) ABSTRACT

A head actuator supporting a data head for read or write operations. The actuator includes a head support excitation shield along a flow path to a leading edge of the slider (or head) to isolate the head support from flow induced excitation and vibration. A method for reading or writing data on a disc via a data head supported by a head support including rotating the disc to create an airflow stream and diverting the air flow stream to shield the head support from excitation.

21 Claims, 9 Drawing Sheets

HEAD ACTUATOR WITH HEAD SUPPORT EXCITATION SHIELD

CROSS-REFERENCE TO RELATED APPLICATION

The present application claims priority to U.S. Provisional Application Ser. No. 60/126,345, filed Mar. 26, 1999 and entitled "PIVOT HOUSING MODIFICATION TO ADDRESS FLOW INDUCED VIBRATION OF THE HEAD GIMBAL ASSEMBLY".

FIELD OF THE INVENTION

The present invention relates to a data storage system. In particular, the present invention relates to a head support shield for shielding the head support from excitation and vibration to, inter alia, limit off-track errors.

BACKGROUND OF THE INVENTION

Disc drives are used to store digitally encoded information on discs. Data heads read data from or write data to data tracks of a disc supported for rotation by a spindle motor or drive. Data heads are supported by a head actuator and include transducer elements for reading data from or writing data to a disc. Typically, data heads "fly" above the disc surface for read and write operations. The transducer elements are supported on a slider of the data head and rotation of the discs creates an air flow under an air bearing surface of the slider to lift the slider above the disc surface for read or write operations. Near contact and contact recording are also known.

The head actuator includes a rigid actuator arm supporting a flexible suspension assembly. Data heads are supported at an extended end of the suspension assembly. The head actuator is rotated or actuated by a voice coil motor to position data heads relative to selected data tracks for read or write operations. During operation, the spindle drive rotates the disc creating an air flow path along the rigid actuator arm and flexible suspension to the air bearing of the slider. Spindle rotation speed of disc drives is increasing to provide faster seek times. Increased spindle rotation increases disc air flow along the rigid actuator arm and flexible suspension to the air bearing. Increased air flow can create more air turbulence causing excitation or vibration of the head support. Depending upon the nature and frequency of the excitation force, excitation or vibration can induce torsional mode resonance, sway mode resonance or bending mode resonance. Vibration or resonance of the head support can induce off-track movement of the data heads. Disc drive data density (or tracks per inch) is increasing and thus drive performance is more sensitive to off-track errors. The present invention addresses these and other problems, and offers other advantages over prior art.

SUMMARY OF THE INVENTION

The present invention relates to a head actuator assembly including a head support excitation shield along the flow path to a leading edge of the head for protecting the head support from flow induced vibration and excitation.

DETAILED DESCRIPTION OF THE PREFERRED EMBODIMENTS

Figure 1:
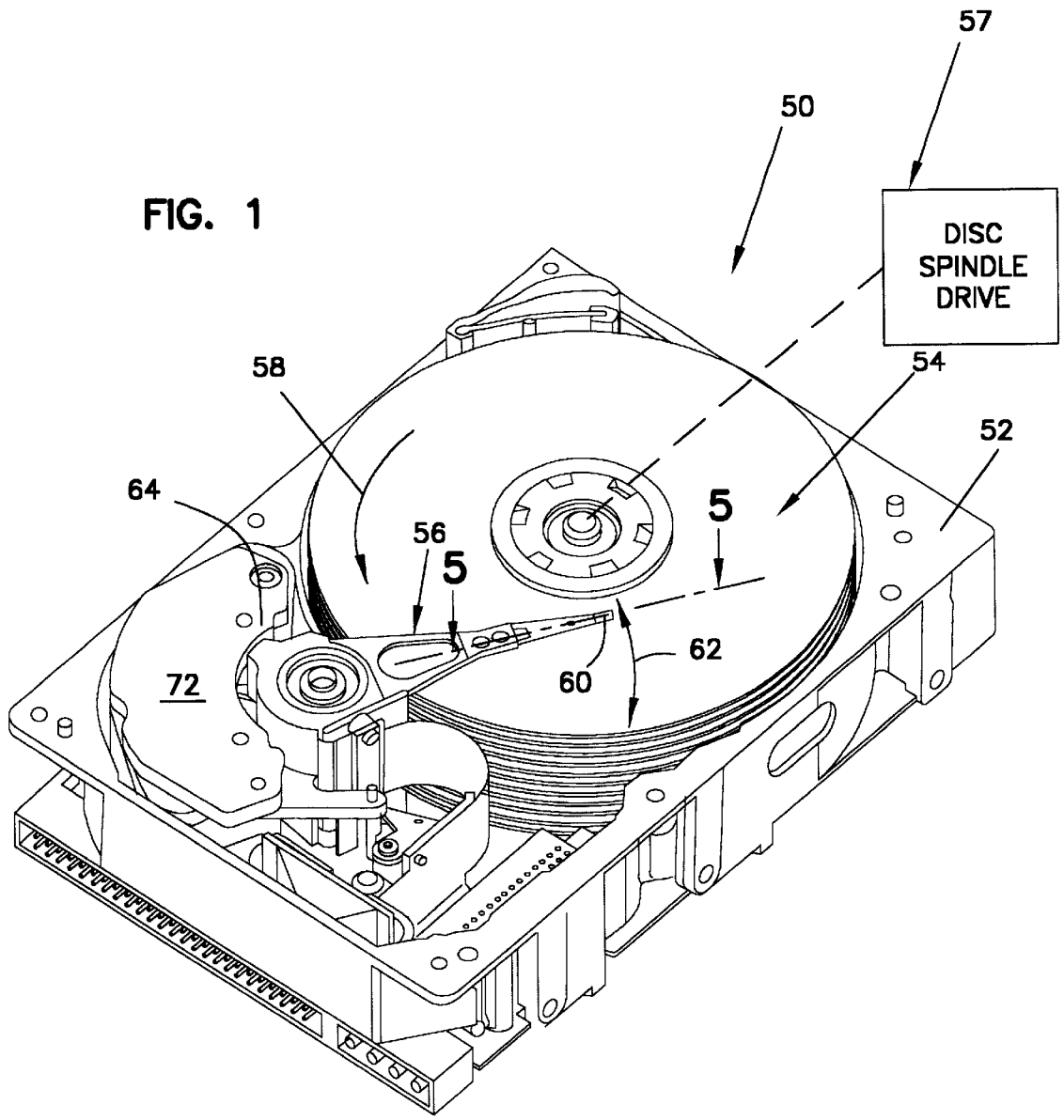
FIG. 1 is a perspective illustration of a rotary disc drive.

FIG. 1. illustrates a rotary disc drive 50 including a disc chassis 52, discs 54 and a head actuator 56. Discs 54 are rotationally coupled to chassis 52 via a disc spindle drive 57 (illustrated diagrammatically) for rotation, as illustrated by arrow 58. Discs store data on concentric data tracks. The head actuator 56 supports data heads 60 relative to a disc surface and in FIG. 1 is rotated to move heads 60 along an arcuate path as illustrated by arrow 62 to position heads 60 relative to selected data tracks for read or write operations via operation of voice coil motor (VCM) 64.

Figure 2:
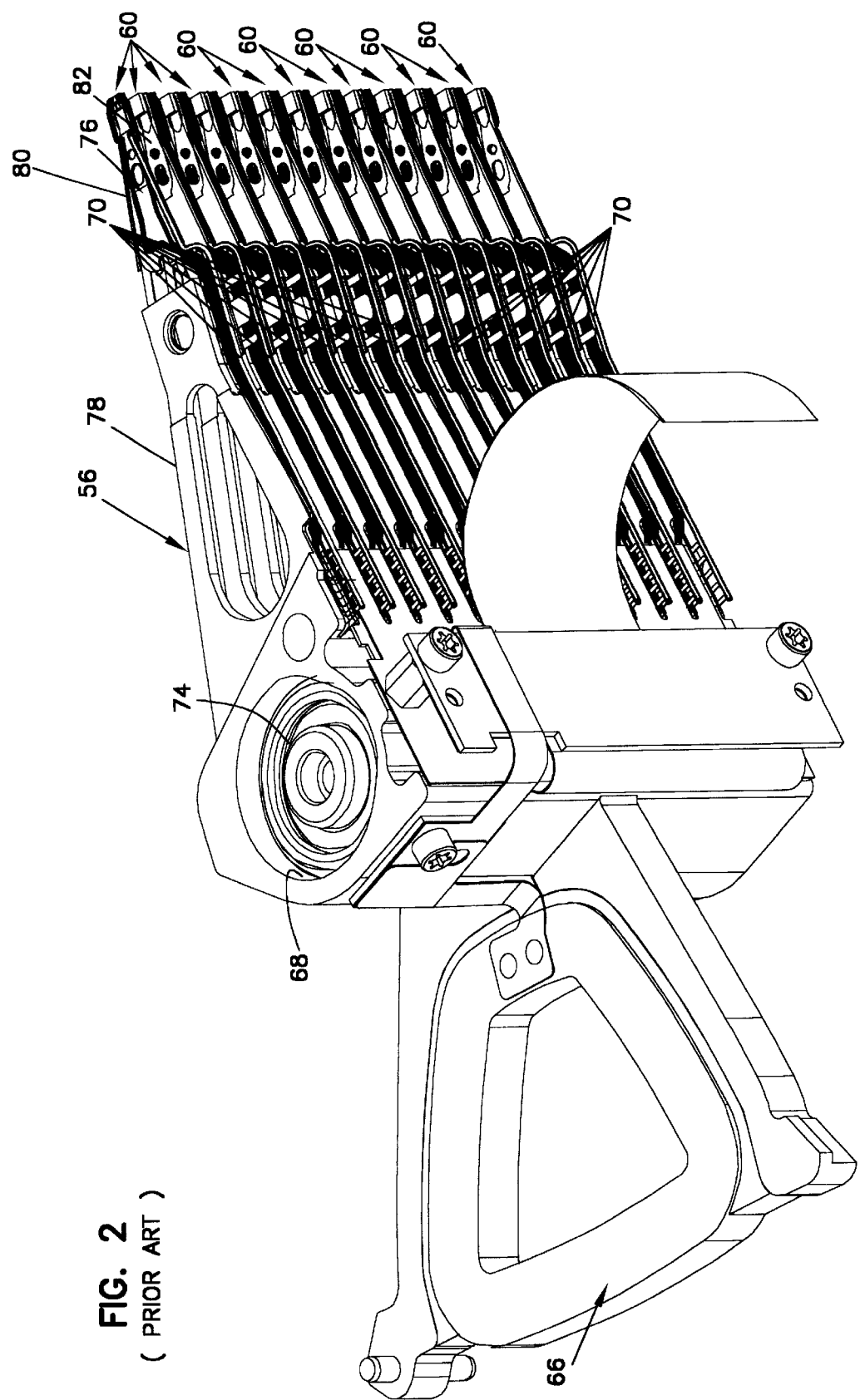
FIG. 2 is a perspective illustration of a head actuator supporting data heads.

FIG. 2 is a perspective illustration of an embodiment of a head actuator 56 supporting heads 60. As shown in FIG. 2, head actuator 56 includes a voice coil 66, a bearing channel 68 and a plurality of stacked head supports 70. Voice coil 66 is supported for operation in a backiron assembly 72 (illustrated in FIG. 1) to form the VCM 64 for moving head actuator 56 along path 62. A bearing cartridge 74 is supported in bearing channel 68 to rotationally connect head actuator 56 to chassis 52. Heads 60 are supported by head supports 70 relative to surfaces of discs in a disc stack for read or write operations.

Figure 3:
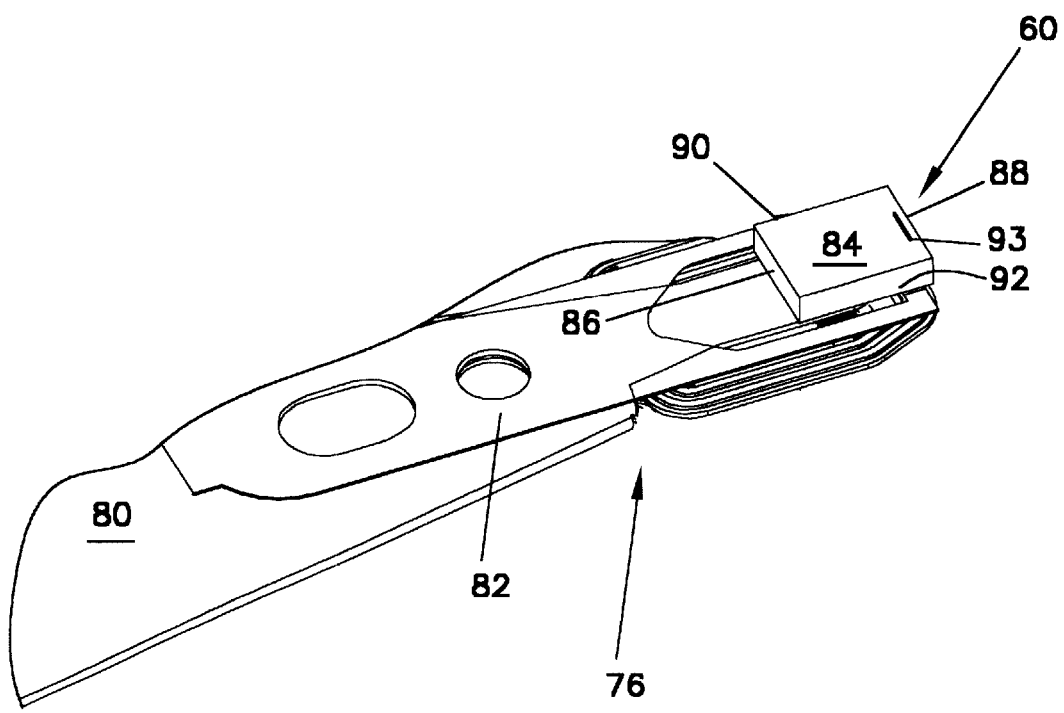
FIG. 3 is a detailed illustration of data heads coupled to a suspension assembly.

In the embodiment shown, head supports 70 include a flexible suspension assembly 76 connected to and supported by a rigid actuator arm 78. The suspension assembly 76 includes an elongated flexible load member 80 and a gimbal spring 82, as shown in FIG. 3. Heads 60 include a slider 84 having leading and trailing edges 86, 88 and opposed side edges 90, 92. Slider supports transducer elements 93 (shown diagrammatically) at the trailing edge 88. Transducer elements 93 may be inductive, magnetorestive or magneto-optical transducer elements. Slider 84 is coupled to suspension assembly 76 via gimbal spring 82 and is supported so that the leading edge 86 of the slider 84 (or data head 60) faces the head support 70 and opposed side edges 90, 92 extend in longitudinal alignment with the head support 70 or suspension assembly 76. Gimbal spring 82 supports the slider 84 or head to pitch and roll relative to the disc surface to follow the topography of the disc surface.

Figure 4:
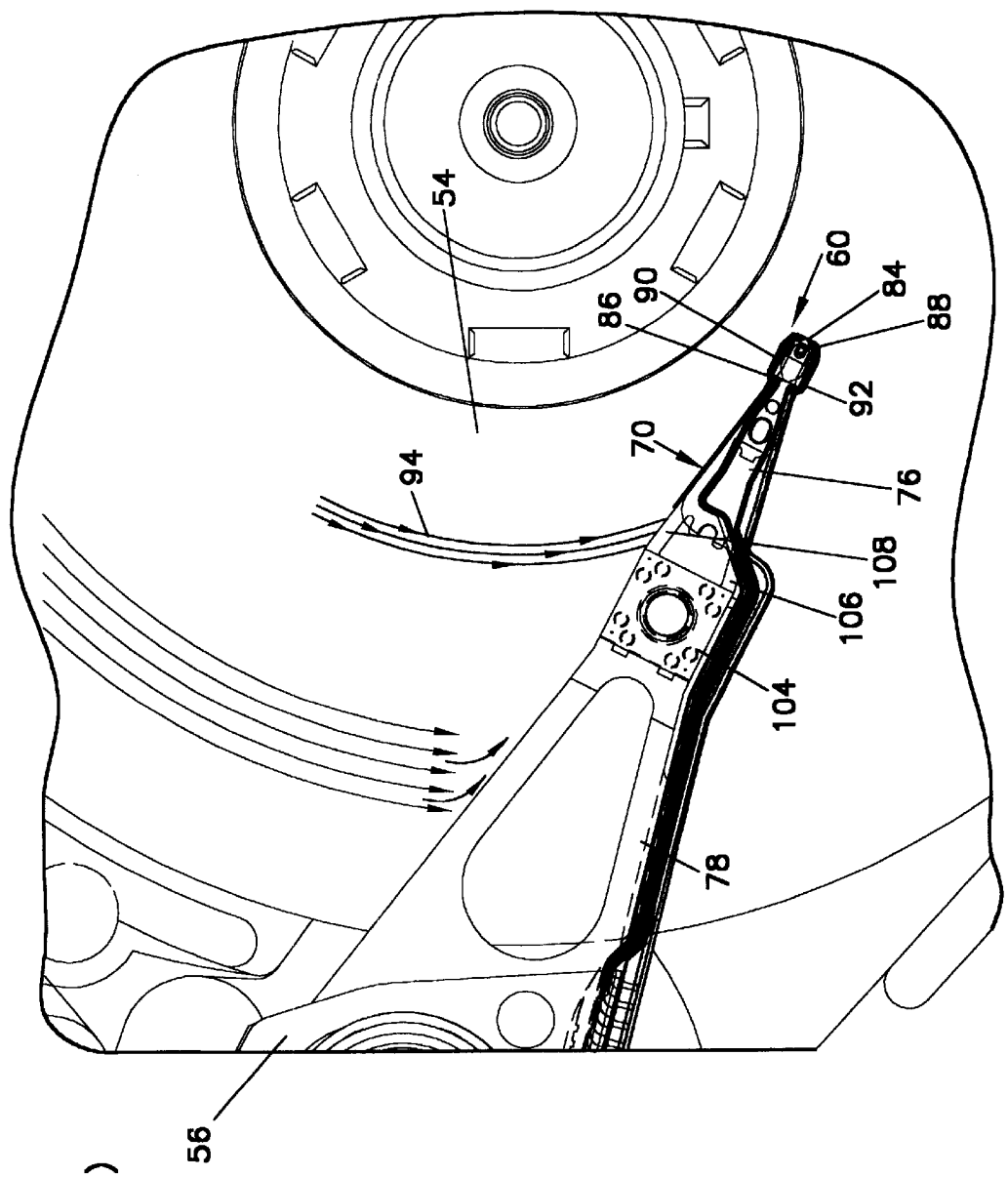
FIG. 4 is a detailed illustration of a prior art head actuator including a head support aligned along an air flow path to a leading edge of a data head.
Figure 5:
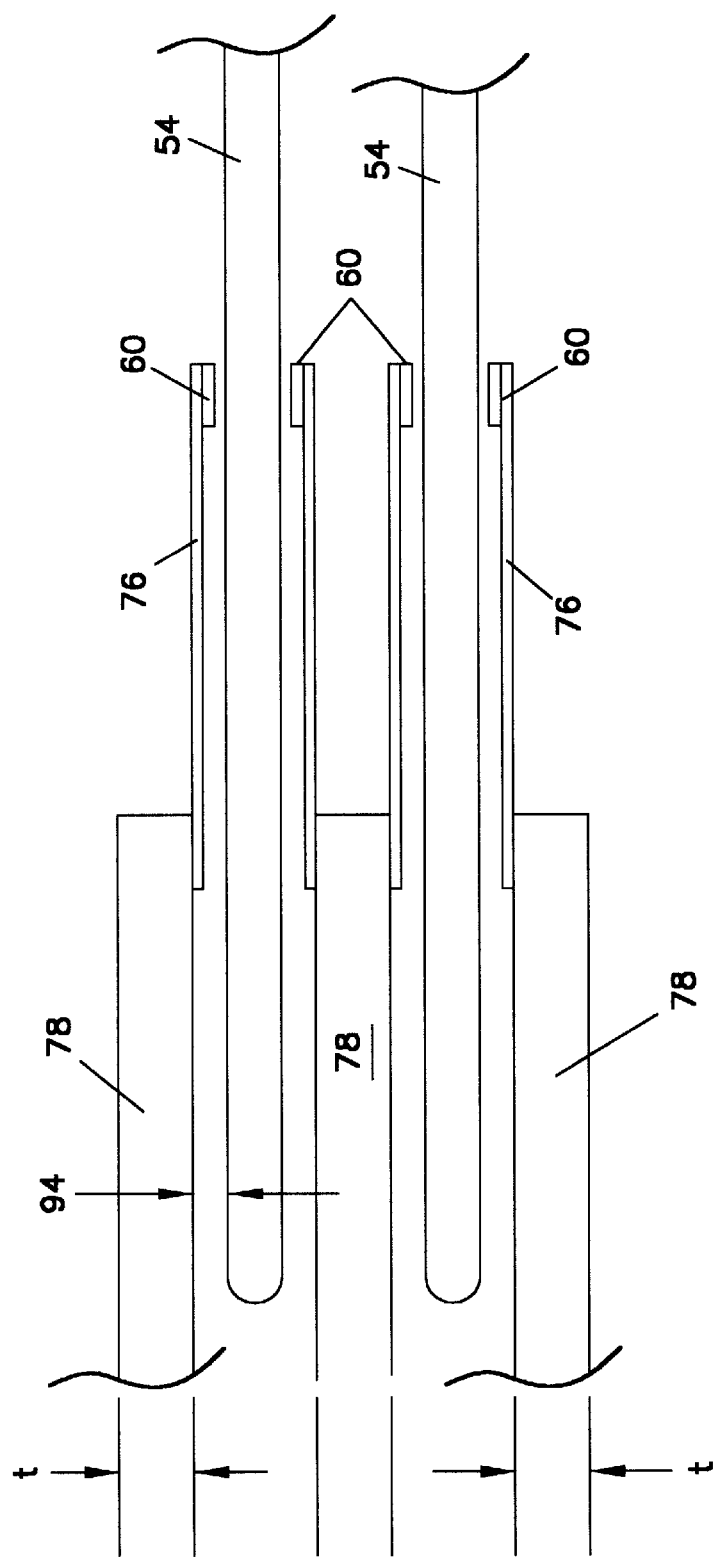
FIG. 5 is a cross-sectional view taken along line 5—5 of FIG. 1.

For operation, discs 54 are rotated by spindle drive 57 which, as shown in FIG. 4, creates an air flow stream as illustrated by arrows 94 along the head support 70 to the leading edge 86 of the slider 84 (head 60) for proximity or near proximity recording. Interference of the head support 70 with the air flow stream can create turbulence. For example, as shown in FIG. 5, the thickness and height of the actuator arm 78 restricts air flow over the disc surface because of the limited spacing 94 between the actuator arm 78 and disc surface 54. The restricted air flow can create a turbulent flow stream as illustrated in the flow velocity profile shown in FIG. 6 which can excite or vibrate the head support 70.

Figure 6:
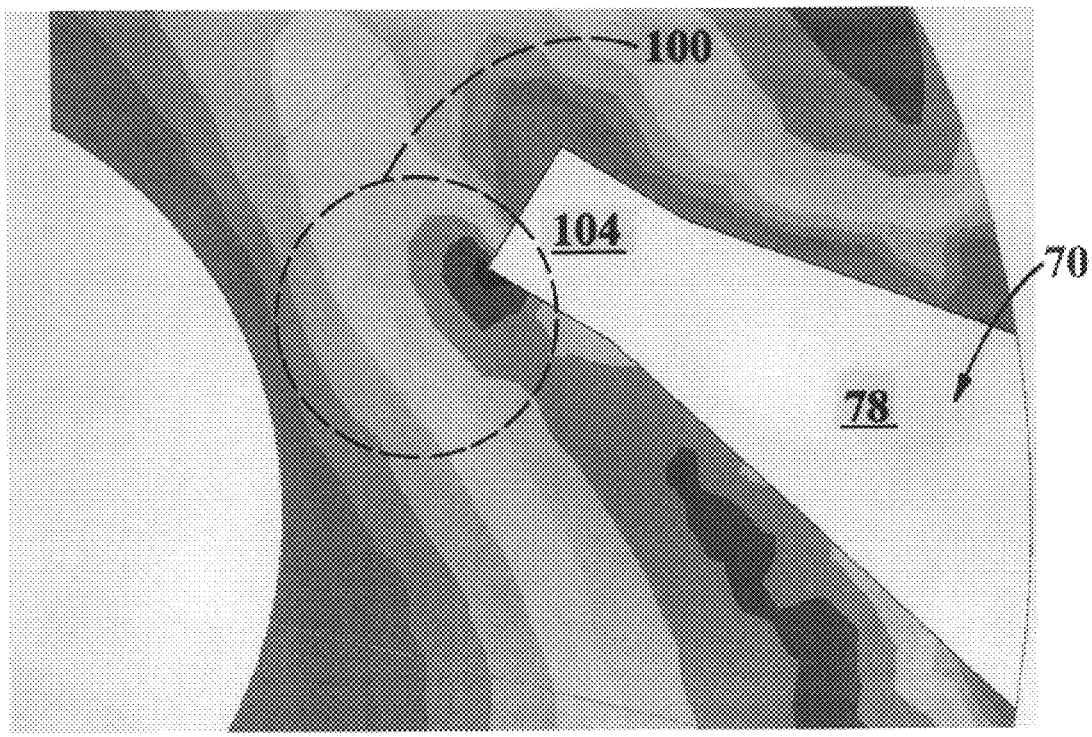
FIG. 6 is a velocity profile of an air flow stream for a prior art head actuator.

As shown in FIG. 6, constricted air flow along head support 70 (actuator arm 78) produces a turbulent air flow region 100 proximate to an extended tip 104 of the actuator arm 78. As illustrated in FIG. 4, a base of suspension assembly 76 is mounted to the tip 104 of the actuator arm 78 proximate to the turbulent flow region 100. The turbulent flow region 100 can interfere or excite motion of the suspension assembly 76. The suspension assembly 76 illustrated in FIG. 4 includes a plurality of struts 106, 108 at the base of the suspension assembly which are particularly sensitive to vibration and excitation. Excitation or vibration of the head support 70 can induce off-track movement of the data heads 60 and can excite torsional, bending or sway mode resonance. Vibration or excitation of the head support 70 can induce head-disc contact due to bending or in-plane movement of the head 60. The present invention relates to a head support shield to divert turbulent air flow and limit vibration or excitation of the head support 70.

Figure 7:
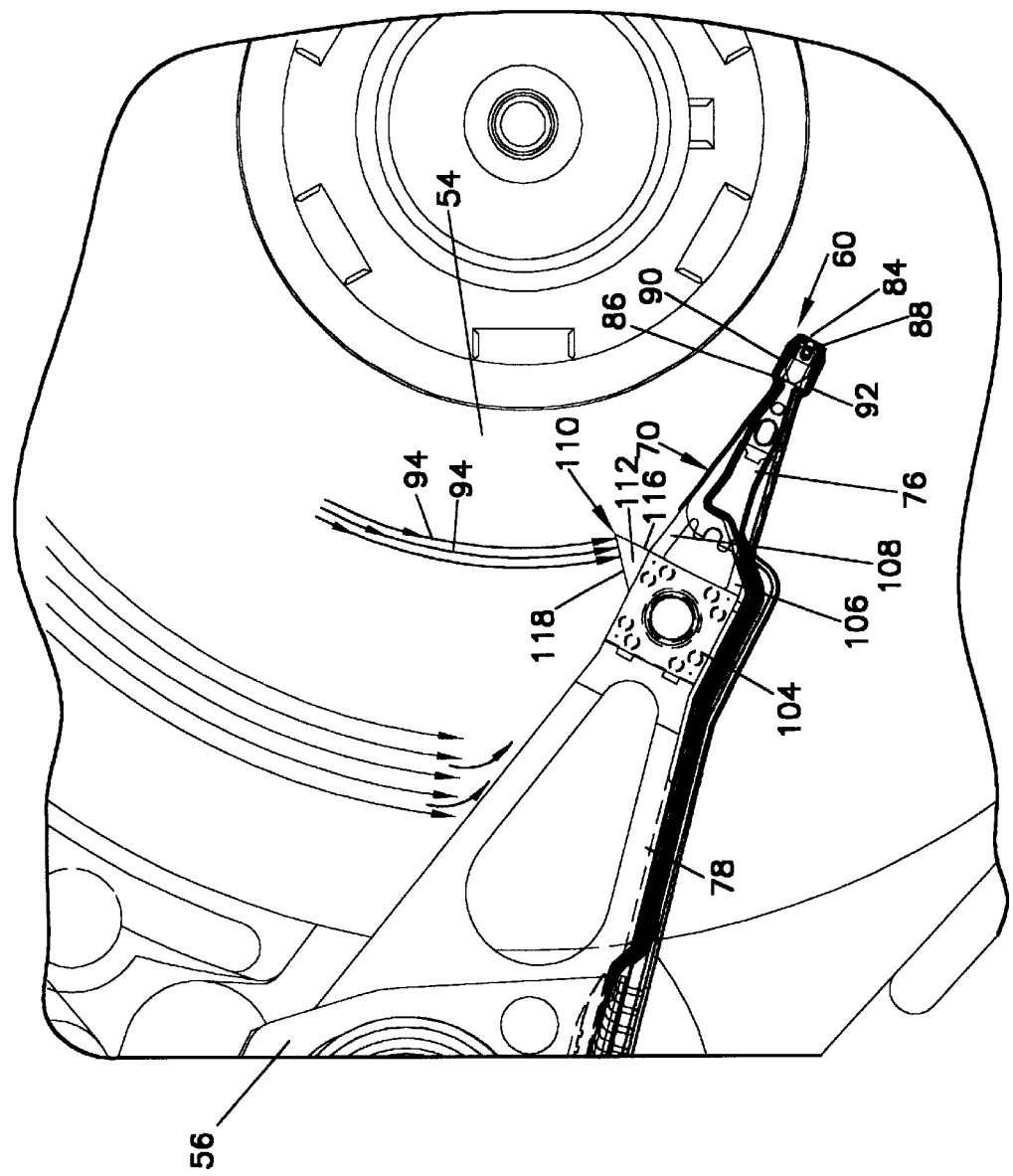
FIG. 7 is a detailed illustration of an embodiment of a head actuator of the present invention including a head support excitation shield along a flow path to a leading edge of the data head.
Figure 8:
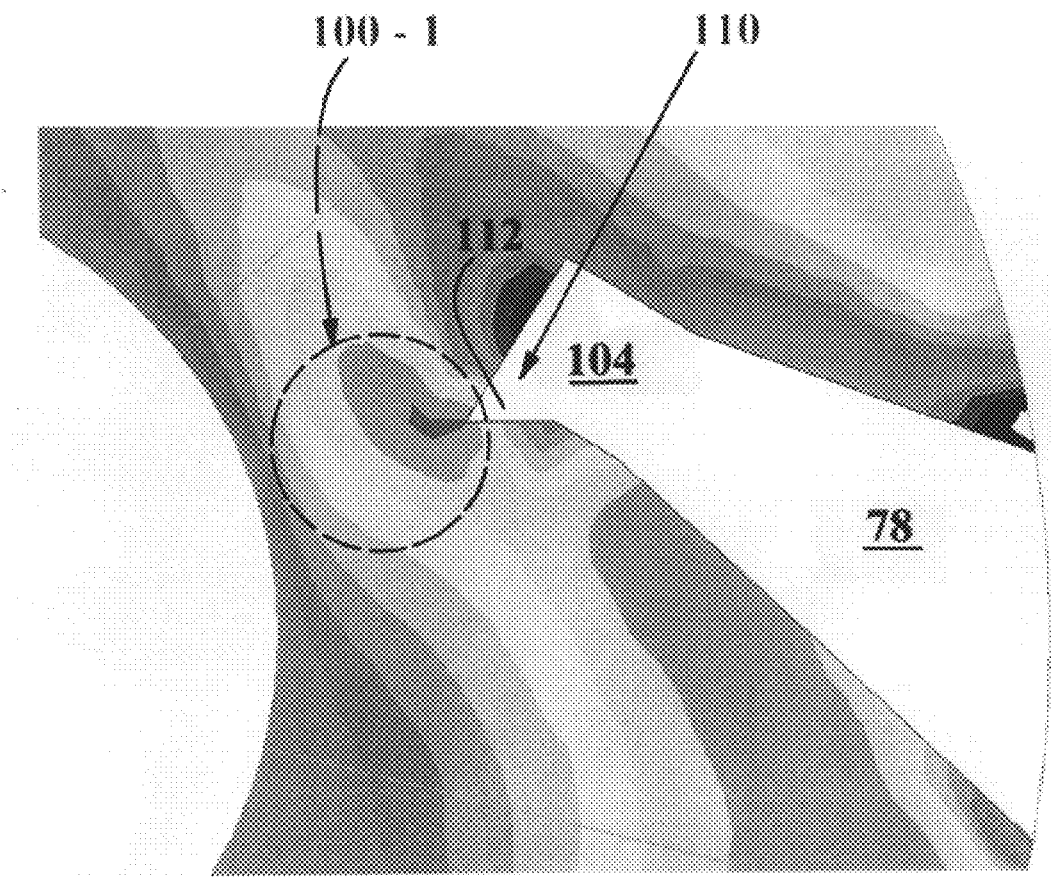
FIG. 8 is a velocity profile of an air flow stream for the head actuator illustrated in FIG. 7.

FIGS. 7–8 illustrate an embodiment of a head support excitation shield 110 of the present invention. The excitation shield 110 illustrated in FIGS. 7–8 alters the restricted air flow to shift turbulent flow region 100-1 away from the head support 70 to limit excitation or vibration of the head support 70. In the embodiment shown, shield includes an air flow extension or finger 112 on the tip 104 of the actuator arm 78 to divert or shift the turbulent flow region 100 from the base of the suspension assembly 76.

As shown in FIG. 7, finger 112 extends from a windward edge (facing the air flow stream) of tip 104. finger 112 protrudes beyond sides of the actuator arm 78 and suspension assembly 76 to form a channel boundary for the turbulent air flow stream spaced from the head support 70. The spaced turbulent air flow boundary protects the head support 70 from excitation and vibration. FIG. 7 illustrates a simulated velocity profile of air flow along actuator arm 78 and finger 112. As shown, the turbulent air flow stream 100-1 is shifted away from the base of the suspension assembly 76 to reduce excitation of the assembly.

As illustrated in FIGS. 7–8, finger 112 includes a flat end face 116 and a sloped edge face 118. The sloped edge 118 angles away from tip 104 of actuator arm 78 in the direction of the air flow stream to direct turbulent air flow away from the head support 70. The thickness -t- of finger 112 is similar to the thickness -t- of the actuator arm 78 illustrated in FIG. 5. Finger 112 can be constructed of aluminum and formed with the actuator arm 78. Finger 112 can be separately formed, for example, on a mounting plate of the suspension assembly and swaged to the tip of the actuator arm 78. Preferably, the finger 112 includes a smooth outer windward edge (edge 118) to limit friction at the boundary walls along the flow channel to provide smooth air flow therealong. In FIGS. 7–8, finger 112 extends from a tip of the actuator arm 78 to shift turbulent flow at the tip of the actuator arm 78. Fingers 112 can be located in other regions of the head support (actuator arm or suspension) to protect the head support 70 from flow induced vibration along the flow path to the leading edge of the slider.

Figure 9:
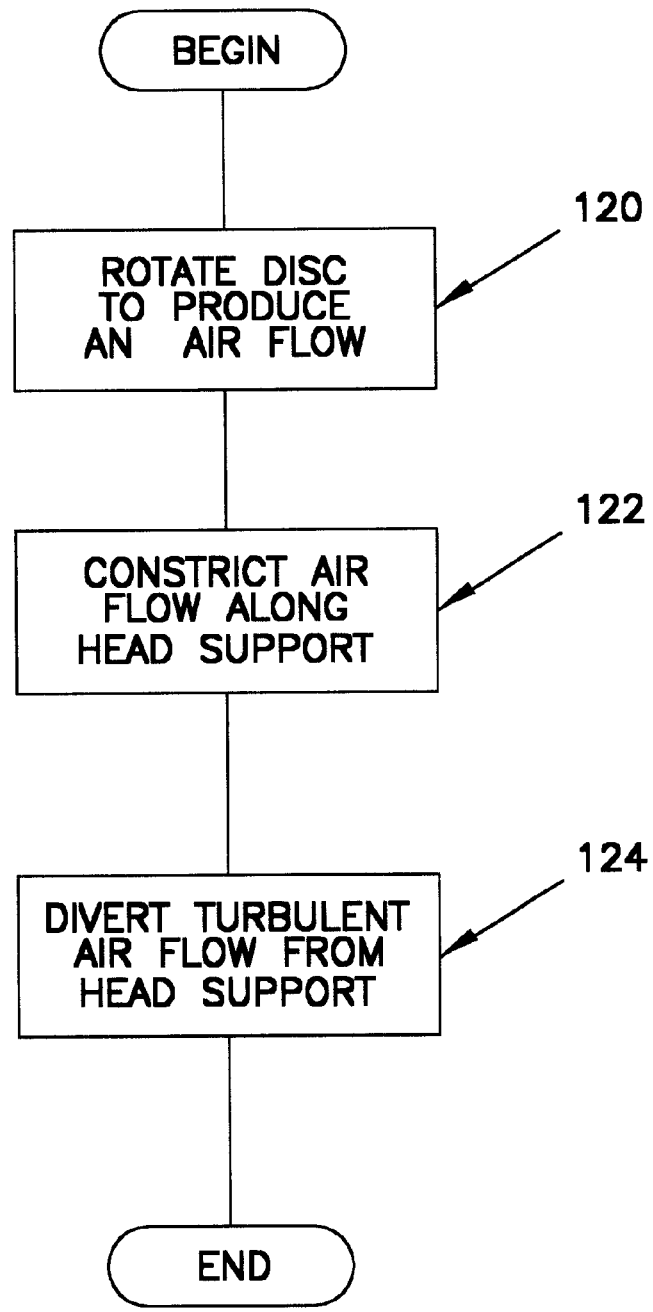
FIG. 9 is a flow chart for a method of operation for reading or writing data to a disc.

Although a particular shaped finger 112 is shown, alternately shaped formations can be used to shift turbulence from the head support 70 and application is not limited to the exact shape and orientation shown. As shown in FIG. 9 for operation, the disc is rotated to create an air flow stream along the head support to the leading edge of the slider for recording as illustrated by block 120. Air flow is constricted along the head support as illustrated by block 122 and is diverted from the head support to shield the head support from excitation as illustrated by block 124. Air flow is diverted to shift turbulent air flow from the head support 70 so that the turbulent air flow does not excite or vibrate the head support 70.

A head actuator assembly 56 for a data head 60 for disc drive including at least one head support 70 extending in longitudinal alignment with opposed sides 90, 92 of the data head. The head gimbal support 70 including a base and an extended end for supporting the data head with the leading edge 86 of the head facing the head support 70 and a longitudinal extent of the head support being generally aligned along a flow path to a leading edge 86 of the data head 60. The head actuator including a head support excitation shield 110 along the flow path to the leading edge 86 of the head to limit excitation of the head support 70.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to a magnetic disc drive system, it will be appreciated those skilled in the art that the teachings of the present invention can be applied to other systems, such as an optical disc drive system, without departing from the scope and spirit of the present invention.

What is claimed is:

1. An head actuator assembly for a disc drive comprising:
 a data head including a leading edge, a trailing edge and opposed sides, the trailing edge including at least one transducer element;
 at least one head support having a cantilevered length extending between a proximal portion to a distal end and including opposed side edge surfaces, the head being supported relative to the distal end of the head support; and
 a head support excitation shield including a protrusion including a protruding edge surface and a body portion having a length extending distally from the protruding edge surface along a length portion of the cantilevered length of the head support to define a length dimension of the body portion of the protrusion extending distally from the protruding edge surface.

2. The head actuator assembly of claim 1 wherein the head support includes a rigid actuator arm and a flexible suspension assembly and the protrusion is formed on the rigid actuator arm.

3. The head actuator assembly of claim 2 wherein the flexible suspension assembly includes a base portion and an extended length and the excitation shield is proximate to the base portion of the flexible suspension assembly.

4. The head actuator assembly of claim 2 wherein the flexible suspension assembly includes a gimbal spring.

5. The head actuator assembly of claim 1 wherein the head support includes a rigid actuator arm and the protrusion is formed at a distal end portion of the rigid actuator arm.

6. The head actuator assembly of claim 5 wherein the protrusion of the excitation shield extends from a windward edge of the actuator arm.

7. The head actuator assembly of claim 5 wherein the excitation shield is connected to the actuator arm.

8. The head actuator assembly of claim 5 wherein the excitation shield is formed integrally with the actuator arm.

9. The head actuator assembly of claim 1 wherein the head support includes a suspension assembly having a base coupled to and extending from a cantilevered end of a rigid actuator arm and the head support excitation shield is connected to the cantilevered end of the actuator arm proximate to the base of the suspension assembly.

10. An actuator comprising:

an actuator block including at least one rigid actuator arm having a cantilevered length extending to a cantilevered end of the at least one rigid actuator arm; and an excitation shield on the rigid actuator arm including a finger along a cantilevered end portion of the at least one actuator arm having a sloped surface, sloped outwardly in a direction of the cantilevered end of the rigid actuator arm.

11. An actuator assembly for supporting data heads comprising:

a head support; and means for shielding the head support from flow induced excitation.

12. The actuator assembly of claim 11 wherein the means for shielding includes a protrusion on an cantilevered end portion of a rigid actuator arm to divert turbulent air flow.

13. The actuator assembly of claim 11 wherein the head support includes a flexible suspension assembly coupled to a cantilevered end portion of a rigid actuator arm and the means for shielding diverts turbulent air flow from a base portion of the flexible suspension assembly.

14. The actuator assembly of claim 11 wherein the head support includes a rigid actuator arm and the means for shielding diverts turbulent air flow from a tip portion of the rigid actuator arm.

15. The actuator assembly of claim 11 wherein the head support includes a rigid actuator arm and a flexible suspension assembly and the flexible suspension assembly extends from a cantilevered portion of the rigid actuator arm and the means for shielding includes a rigid finger extending from a windward edge of the cantilevered portion of the actuator arm to form a channel boundary directing turbulent air flow from the flexible suspension assembly.

16. A method for reading or writing data on a disc comprising steps of:

a) rotating a disc creating an air flow stream along a head support supporting a data head at an extended end thereof to provide an air flow path along the head support to a leading edge of the data head; and b) providing a head shield on the head support having a protrusion having a protruding edge surface and a body portion having a length extending distally from the protruding edge surface and an extended width and diverting turbulent air flow along the air flow path to the leading edge of the head away from an extended portion of the head support toward the extended width of the head shield protrusion to shield the head support from excitation.

17. The method of claim 16 wherein the head support includes a flexible suspension assembly wherein the step of diverting turbulent air flow along the air flow path includes:

c) diverting turbulent air flow from the flexible suspension assembly to shield the flexible suspension assembly from excitation.

18. The method of claim 16 wherein the head support includes a rigid actuator arm and the step of diverting turbulent air flow along the air flow path includes:

c) diverting turbulent air flow from the rigid actuator arm toward the extended width of the head shield protrusion.

19. The method of claim 16 comprising the step of:

c) constricting air flow along the head support creating a turbulent flow region; and d) diverting the turbulent flow region away from a base of a flexible head suspension assembly of the head support toward the extended width of the head shield protrusion to shield the flexible suspension assembly from excitation.

20. An actuator comprising:

an actuator block including at least one rigid actuator arm having a cantilevered length extending to a cantilevered end of the at least one rigid actuator arm; and a protrusion along a cantilevered end portion of the at least one rigid actuator arm and the protrusion includes a sloped edge surface that flares outwardly in a direction toward the cantilevered end of the rigid actuator arm to shift air flow.

21. The actuator of claim 20 wherein the at least one actuator arm is tapered along a portion of the cantilevered length thereof to form a narrowing width dimension along the portion of the cantilevered length of the actuator arm.

* * * * *